United States Patent [19]

Haffner et al.

[11] 3,744,522
[45] July 10, 1973

[54] MULTIPLE OUTLET SPOOL VALVE

[75] Inventors: Donald G. Haffner; Glenn R. Hubbard, both of Racine, Wis.

[73] Assignee: Jacobson Manufacturing Company, Racine, Wis.

[22] Filed: June 7, 1972

[21] Appl. No.: 260,464

[52] U.S. Cl. ..................... 137/625.17, 137/625.69
[51] Int. Cl. .......................... F16k 3/26, F16k 11/07
[58] Field of Search ................. 137/625.17, 625.69, 137/636.4

[56] References Cited
UNITED STATES PATENTS

| 3,055,393 | 9/1952 | Weaver | 137/625.17 X |
| 3,319,725 | 5/1967 | Edwards | 137/625.17 X |

Primary Examiner—William R. Cline
Attorney—Arthur J. Hansmann

[57] ABSTRACT

A multiple outlet spool valve having a valve housing with a plurality of fluid inlets and fluid outlets and an intermediate chamber. A spool is axially and rotatably movably disposed within the chamber and has sealing portions for selectively blocking flow to the outlets. Fluid passageways are provided in the spool sealing portions, and additional fluid outlets are in the housing for fluid-flow communicating with the spool fluid passageways such that fluid can be selectively directed to the additional fluid outlets through the fluid passageways and thereby returned to the tank or reservoir. A handle is connected to the spool for the axial and rotatable movement of the spool, and the spool and the outlets are arranged such that axial movement of the spool blocks fluid flow to all the outlets, and rotational movement of the spool permits the fluid to by-pass to selective ones of the additional said outlets to return fluid to the tank.

7 Claims, 5 Drawing Figures

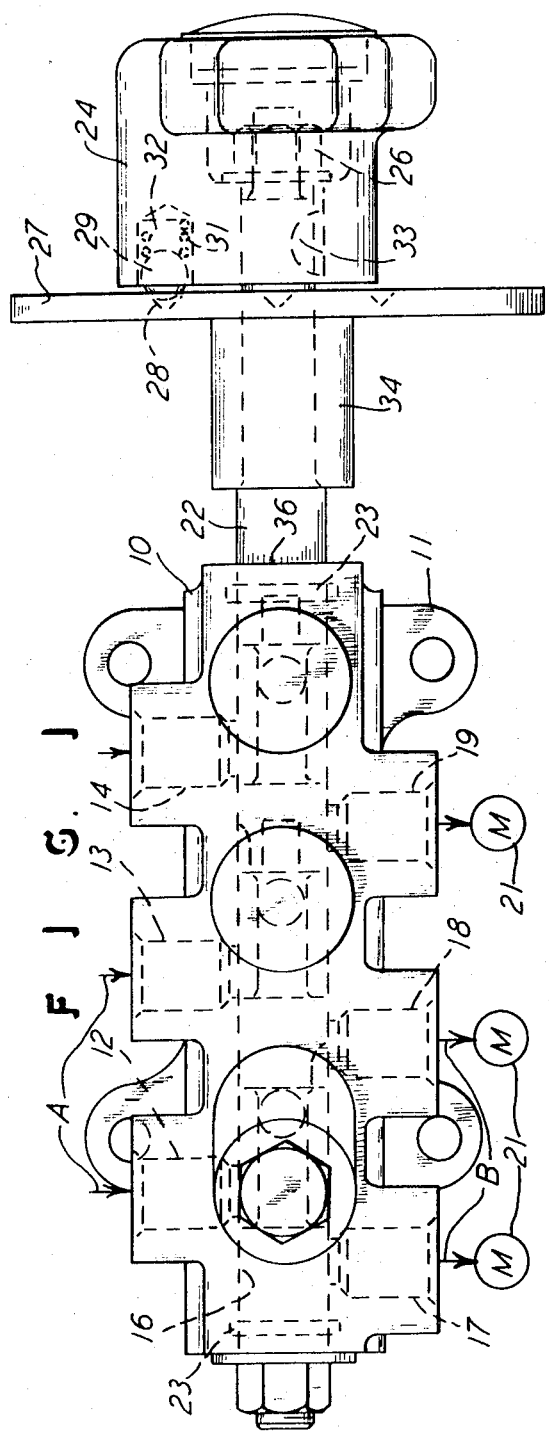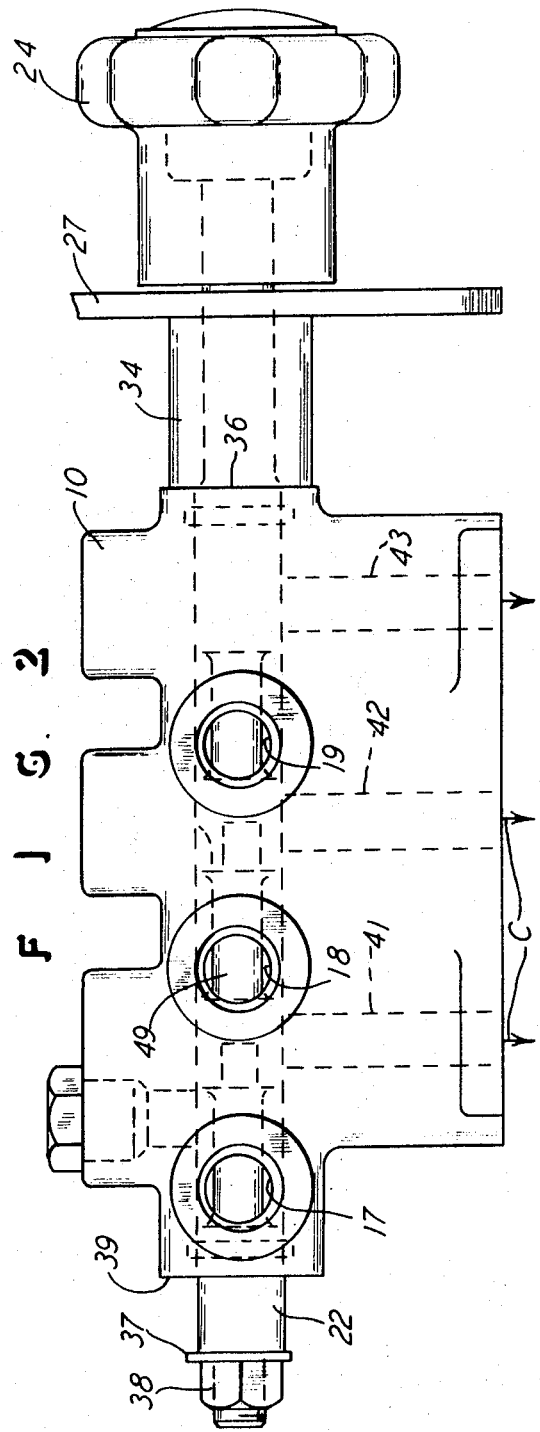

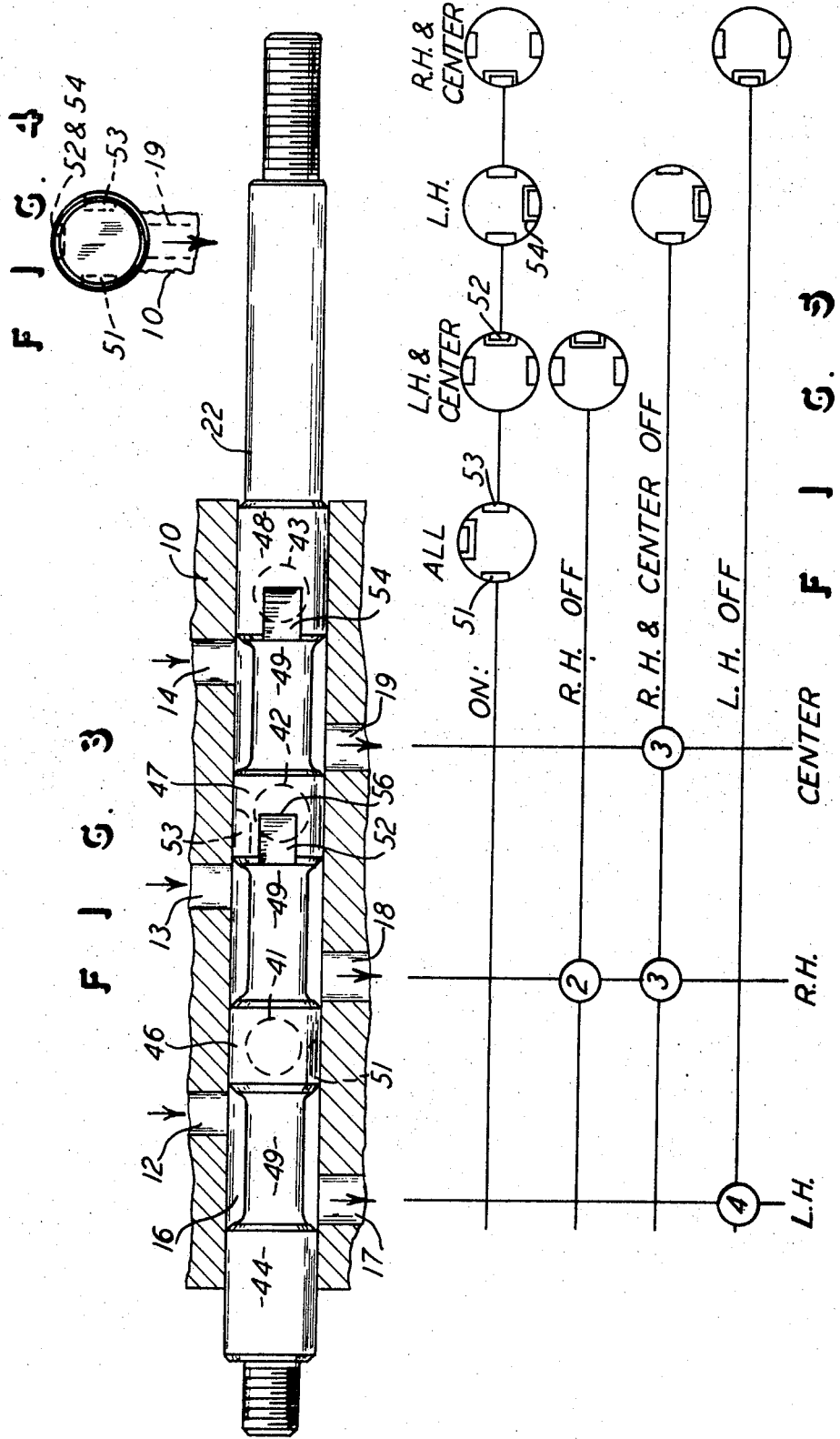

MULTIPLE OUTLET SPOOL VALVE

This invention relates to a multiple outlet spool valve and, more particularly, it relates to a spool valve wherein the fluid can be selectively directed to certain ones or all of the valve outlets for selective pressurizing of the valve outlets.

BACKGROUND OF THE INVENTION

The prior art is already aware of many different constructions of spool valves for the control of fluid through the valve, including hydraulic valves which control the flow of oil in multiple outlets in the valve. Further, prior art constructions are commonly made with a spool which is axially and rotatably movable within the valve housing for selectively opening and closing the various outlets of the valve.

However, the prior art valves are complex in their structures and they are not fully versatile in the selective control and flow of fluid to the several valve outlets. Accordingly, it is a general object of this invention to provide a multiple outlet spool valve which is capable of selectively controlling the fluid flow to the valve outlets, and which is a simplified valve structure so that the valve is efficient in its sealing operation and so that the valve is easily operated and easily maneuvered for positioning the valve spool in the several positions, each of which provide a different arrangement of fluid flow from the valve.

A more specific object of this invention is to provide a multiple outlet spool valve wherein the spool is axially movable for opening and closing all of the valve outlets, and wherein the spool is rotatable, when in one axial position, for selective passing of fluid to only certain of the valve outlets. Additionally, this specific object is accomplished while the aforementioned objective of providing a simplified type valve which is efficient and easy to operate is also accomplished.

Other objects and advantages will become apparent upon reading the following disclosure.

BRIEF DESCRIPTION OF THE DRAWINGS

FIG. 1 is a top plan view of a valve embodying this invention.

FIG. 2 is a side elevational view of the valve of FIG. 1, and showing the spool and handle in a different position from that seen in FIG. 1.

FIG. 3 is a longitudinal sectional view taken along the axis of the spool as in FIG. 2, and being slightly enlarged therefrom.

FIG. 4 is an end elevational view of a fragment of FIG. 3.

FIG. 5 is a diagram of the various settings of the spool shown in the previous figures and indicating the effect of those settings.

DETAILED DESCRIPTION OF THE PREFERRED EMBODIMENT

The drawings show a valve body or housing 10 having feet portions 11 for mounting the valve, if desired. The body 10 is shown to have three fluid inlet openings 12, 13 and 14, and fluid will then enter the valve 10 in the direction of the arrows designated A as fluid flows into the three inlets mentioned. The valve 10 has an intermediate chamber 16, and this chamber is generally cylindrically shaped and extends from end to end of the valve 10, as shown. The valve 10 has three fluid outlets 17, 18, and 19, and fluid flows from the valve 10 in the direction of the arrows designated B. FIG. 1 further shows that three hydraulic motors, with the letter "M" and designated 21 are in separate flow communication with the respective outlets 17, 18, and 19, so that fluid may flow from the valve 10 and in separate lines therefrom and to the individual three motors described. It will therefore be understood that the valve 10 controls the flow of fluid to the motors 21.

A valve spool 22 is generally cylindrically shaped and is disposed within the valve chamber 16 and is rotatable and axially movable therein. Fluid sealing portions 23 are in opposite ends of the valve housing 10 and surround the adjacent portions of the spool 22 to prevent the escape of fluid from the housing 10. A handle 24 is affixed to the extending end of the spool 22, and a nut 26 is shown to connect the handle 24 to the extending end of the spool 22. Also, an index plate 27 is located adjacent the handle 24 and has four indents 28 therein on the face thereof adjacent the handle 24. A ball 29, spring loaded in the handle 24 by means of the spring 31 in a pocket 32 in the handle 24, extends from the handle 24 to engage a selected one of the indents 28 and thereby hold the handle 24 and thus hold the spool 22 in any one of the four selected rotated positions, and these four positions may be equally spaced apart at a quarter turn for the handle 24. Of course the handle 24 and the spool 22 rotate together by means of the key 33 extending therebetween. Thus the index plate 27 is movable between its position of FIG. 1 and its position in FIG. 2, but it will be understood that the plate 27 does not rotate and is suitably guided to permit the axial movement while precluding the rotational movement for the plate 27. A boss 34 affixed to the plate 27 moves toward and away from the valve housing 10 and abuts the valve end wall 36 in the FIG. 2 position and thus limits the axial movement of the spool 22.

The opposite end of the spool 22 has a washer 37 and nut 38 which co-operate with the valve end surface 39 to limit the movement of the spool 22 from the FIG. 2 position back to the FIG. 1 position.

The valve housing 10 also has three additional fluid outlets 41, 42, and 43, and it will be understood that these outlets permit the flow of fluid in the direction of the arrows designated C, and these three outlets are suitably connected to a reservoir or tank for the fluid, such as the hydraulic fluid. Thus the outlets 41, 42, and 43 are return lines for the system being described.

FIG. 3 shows that the spool 22 is provided with fluid sealing portions 44, 46, 47, and 48. The drawings further show that each fluid inlet 12, 13, and 14 is separately located and arranged with one of each of the fluid outlets to form three separate circuits through the valve. That is, fluid inlet 12 is located in a position intermediate the fluid outlet 17 and the fluid outlet 41. Thus the fluid inlet 12 and the fluid outlets 17 and 41 form one circuit through the valve 10. The other inlets and outlets are likewise arranged to form two other fluid circuits. In further explanation, it will be seen in FIG. 3 that if fluid were entering the inlet 12 it would pass to and through the outlet 17. Additionally, if the spool 22 were shifted to the right from the position shown in FIG. 3, and that would be at the position shown in FIG. 1, then fluid would enter the inlet 12 and flow to and through the outlet 41, and the outlet 17 would be blocked to the flow of fluid. Thus the circuit arrangement exists as described with respect to each fluid inlet 12, 13, and 14. Also, it will be understood that the inlet 12 and outlet 17 are on diametrically opposite sides of the valve housing 10, and thus the fluid pressure on the spool 22 and particularly on its sealing portion 44 causes the spool to tightly seal over the outlet 17 when the spool is in the FIG. 1 position. The same efficiency and arrangement is true relative to the spool sealing portions 46 and 47 with respect to the valve outlets 18 and 19, respectively. Of course it will be further understood that the sealing portions 46, 47, and 48, when the spool is in the FIG. 3 position, are sealing against the flow of fluid to the three additional outlets 41, 42, and 43, so the fluid must go to the outlets 17, 18, and 19, and it can go to those three outlets only. Thus it will also be seen and understood that the spool 22 has a reduced diametrical portion 49 between every two sealing portions shown and described.

The spool 22 has fluid passageways on certain of the sealing portions, and these passageways extend in fluid flow communication from the chamber 16 and to each of the three outlets 41, 42, and 43. Thus, there is a fluid passageway 51 on the sealing portion 46, and there is a fluid passageway 52 and a fluid passageway 53 on the sealing portion 47, and there is a fluid passageway 54 on the sealing portion 48. The four fluid passageways shown and described are in the form of grooves or slots which extend along the circumference of the respective sealing portions and which terminate intermediately therealong, such as the terminal end 56 of the passageway 52. That is, the fluid passageways extend sufficiently along the fluid sealing portions to flow communicate with the respective fluid outlets 41, 42, and 43, depending upon the rotation of the spool 22.

FIG. 4 shows the orientation of the fluid passageways, and it shows the rotated position of the spool as it is in FIG. 3, and it also shows the alignment of the fluid outlets to the tank, by showing the fluid outlet 19. In that position of the spool 22, fluid cannot flow from the chamber 16 and to any one of the three outlets 41, 42, or 43. However, if the spool 22 were rotated a quarter turn in either direction, then there would be passage of fluid through one of the fluid passageways and to its respective fluid outlet to the tank.

FIG. 5 shows the various positions of rotation of the spool 22, and here it will be seen that the spool can be positioned so that all of the motors 21 are being pressurized by fluid and are therefore all in the "ON" position, and these motors are designated as left hand, center, and right hand, by the designations of FIG. 5. Also, the diagramatic showing of FIG. 5 aligns with the showing of FIG. 3 such that the outlet 17 is the "left hand" motor, and the outlet 18 is the "right hand" motor, and the outlet 19 is the "center" motor.

The top line in FIG. 5 therefore shows the motors which can be in the "ON" position, depending upon the axial displacement of the spool 22 and the rotated position thereof. In the position designated "2" in FIG. 5, the right hand motor is off, and the spool 22 is in a position where the passageway 53 is aligned with the outlet 42 and thus fluid can go from the inlet 13 and to the outlet 42, rather than going to the outlet 18 which is meeting resistance of the motor 21 connected with the outlet 18. In this manner, fluid is by-passed relative to the outlet 18 while it is still permitted to be flowing through the outlets 17 and 19 and thus the left hand and center motors are still on or operating. Likewise, the position "3" of FIG. 5 shows that another one of the right hand passageways, namely the one designated 52, and the center passageway 54 are both aligned with the respective outlets 18 and 19 and thus fluid is by-passed relative to those two outlets while it flows only to the outlet 17 and thus only the left hand motor is on. Finally, in position "4" the fluid passageway 51 has been rotated to where it aligns with the fluid outlet 41 and thus bypasses the fluid relative to the fluid outlet 17, and therefore the right hand and center motors are on while the left hand motor is off.

For purposes of clarity in describing the arrangement and function, FIG. 5 shows the fluid passageways 52 and 54 of two different sizes, and this is simply depicted that way so that both fluid passageways could be indicated in the diagramatic end view of the spool as indicated in FIG. 5. Actually, all fluid passageways would preferably be of the same size, as shown in the other drawings. Also, it will be understood that there could be other types of hydraulic mechanisms such as hydraulic cylinders, rather than hydraulic motors 21, which would be connected with the valve outlets and be fluid pressurized thereby. The valve has special application on a three-gang type of lawn mower which is hydraulically powered by the motors 21, and thus the terminology for the left hand, right hand, and center motors which are in accordance with the three mowers in the gang lawn mower. Thus the operator can select which of the mowers is to be operating at any particular time, according to the spool valve disclosed herein.

What is claimed is:

1. In a multiple outlet spool valve, a valve housing having a plurality of fluid inlets and fluid outlets and a chamber in the path of flow between said inlets and said outlets, a spool movably disposed in said chamber, a handle connected to said spool for moving said spool in said chamber, a plurality of additional fluid outlets in fluid flow communication with said chamber, said fluid inlets and all said fluid outlets being arranged in circuits which each have one of said fluid inlets arranged with one fluid outlet from each of both of the pluralities of said fluid outlets, said spool having a fluid sealing portion disposed between every two said circuits of said fluid inlets and said fluid outlets for blocking the flow of fluid in said circuit arrangements, the first said fluid outlets and the additional said fluid outlets being spaced apart from each other in the path of movement of said spool to permit said spool sealing portions to alternately close and open the additional said fluid outlets, the improvement comprising said sealing portions having fluid passageways thereon and extending therealong to flow-communicate from said chamber to respective ones of the additional said fluid outlets, and with said fluid passageways being disposed on said spool in orientations of flow communication different from each other, relative to the respective additional said fluid outlets, for alternately flow-communicating a selected one of the additional said fluid outlets with said chamber to the exclusion of the other of the additional said fluid outlets.

2. The multiple outlet spool valve as claimed in claim 1, wherein said spool is rotatably and axially movably mounted for the selective flow of fluid to all said fluid outlets, and wherein said sealing portions are located on said spool to block flow of fluid to all the first said fluid outlets upon axial movement of said spool.

3. The multiple outlet spool valve as claimed in claim 2, wherein said fluid passageways extend along said sealing portions to various respective sides thereof and to a limit intermediate the axial length of said sealing portions for directing the flow of fluid to the additional said fluid outlets in accordance with the rotated positions of said spool.

4. The multiple outlet spool valve as claimed in claim 3, wherein said sealing portion is cylindrically shaped and said fluid passageways are grooves extending on the circumference of said sealing portions.

5. The multiple outlet spool valve as claimed in claim 4, wherein one of said sealing portions has two of said fluid passageways spaced apart for alternately fluid flow communicating with one of the additional said fluid outlets.

6. The multiple outlet spool valve as claimed in claim 1, wherein said sealing portions and all said fluid outlets and said fluid passageways are all located relative to each other to simultaneously present fluid flow paths from said chamber to all the first said fluid outlets and only some of the additional said fluid outlets.

7. The multiple outlet spool valve as claimed in claim 6, wherein there are three said circuits of said inlets and said outlets, and three said sealing portions for said circuits, each of said sealing portions having an orientation of said fluid passageways different from that of the other two of said sealing portions.

* * * * *